ELECTROSTATIC VOLTAGE MULTIPLIER

Filed Sept. 1, 1950

INVENTORS
CARL BOSCH
MORRIS H. SHAMOS
BY Ralph W. E. Bitner
ATTORNEY

Patented Sept. 16, 1952

2,610,994

UNITED STATES PATENT OFFICE 2,610,994

ELECTROSTATIC VOLTAGE MULTIPLIER

Carl Bosch, Westfield, N. J., and Morris H. Shamos, New York, N. Y., assignors to Chatham Electronics Corporation, Newark, N. J., a corporation of New Jersey Application September 1, 1950, Serial No. 182,876

10 Claims. (Cl. 171—329)

This invention relates to electrostatic voltage multipliers, and has particular reference to machines which employ rotors to carry electrical charges from one capacitor to another. The devices hereinafter described are especially suited for use with voltage sources of very high impedance; that is, voltage supply circuits which are incapable of furnishing enough power to operate a meter.

It is a well known fact that if an electrical charge be moved from a region of high capacity to one of low capacity, the voltage will be increased in proportion to the inverse ratio of the capacities. This fact is the basis of design of most of the static influence generators.

Influence generators employing rotating glass disks used a feed back circuit to effect a continuous build-up in voltage until a breakdown occurred. The present voltage multipliers are carefully shielded from all feed back and produce a predetermined voltage ratio which does not exceed an established value.

One of the characteristics of static influence generators and other machines employing rotary members is the long period of time necessary to establish equilibrium. A single stage rotary voltage multiplier of high gain may take over twenty seconds to reach its final value, a time interval which is too long for most classes of measurement.

One of the objects of this invention is to provide an improved voltage multiplier which lowers the time interval necessary to reach a stable value.

Another object of the invention is to provide a voltage multiplier which extracts a negligible amount of current from the input supply circuit.

Another object of the invention is to provide a small portable voltage multiplier, convenient to handle, for measuring the potentials of electrically charged bodies.

The invention comprises a plurality of rotatable insulated disks mounted on a single shaft and turned by a motor. Each disk carries a number of conducting sectors arranged around the disk periphery. Two stator induction plates are mounted adjacent each disk, one plate which receives the input charge and a second which collects the charge and transfers it to another disk or to an external load circuit.

For a better understanding of the present invention, together with other and further objects thereof, reference is made to the following description taken in connection with the accompanying drawings.

Figure 1:
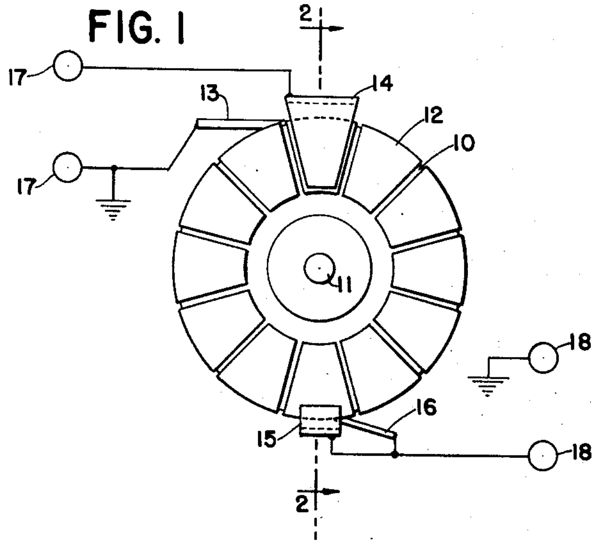
Fig. 1 is a side view of one of the rotors, showing the input and output circuits, and the two induction plates.
Figure 2:
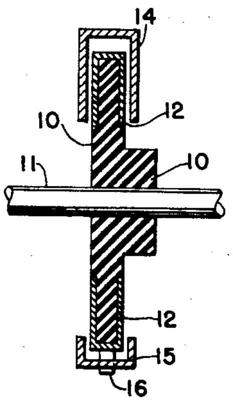
Fig. 2 is a cross sectional view of the rotor of Fig. 1, taken along line 2—2 of that figure.

Referring now to Figs. 1 and 2, a rotor disk 10, made of insulating material, is secured to a shaft 11. A plurality of conducting sectors 12 are fastened to the disk periphery and extend on both sides of the disk as well as across the edge. An input brush 13 is mounted on the stationary frame so as to make electrical contact with the edge portions of the sectors 12 as the disk revolves and an input induction plate 14 is mounted on the frame to act as a capacitor with the sectors which rotate through its field.

On the opposite side of disk 12 a second stator plate 15 is secured, together with a second brush 16. The capacitance between the rotor plate and the input plate in the output position is considerably less than that in the input or "charge" position since their inverse ratios determine the voltage multiplying factor. In some cases the plate 15 has been eliminated, using only the brush as the output capacitor.

In order to describe the operation of this device, let it be assumed that the disk is rotated at a fixed speed and that a voltage of 10 volts is applied at the input terminals 17. Then the sectors 12 passing adjacent to sector plate 14 are charged up by influence due to the connection made through brush 13. When contact with the brush is broken, a charge corresponding to a voltage of 10 volts is isolated on each sector and is carried by the sectors to the second plate 15 and brush 16. As the sectors leave the vicinity of plate 14, their potential is raised due to the decrease in capacitance, and as the sectors approach plate 15, their potential is still further increased until the predetermined maximum is reached at a position adjacent to plate 15. Output terminals 18 are connected to ground and to brush 16. A load circuit, such as an electrostatic voltmeter, may be connected to these terminals.

When the machine is first started, the second plate 15 is uncharged and a number of sectors must be rotated through the field of capacitor plate 15 and in contact with brush 16 before the brush and plate assume their final value. The time required for the voltage build-up depends upon the speed of rotation, the ratio of the stator plate capacitances and the load capacitance.

The current flowing through the multiplier due to the charges transferred by the rotor segments is $$I=faV_AC_A$$

where

I is the current in amperes;
$a$ is the number of segments on the disk;
$f$ is the frequency in revolutions per second;
$V_A$ is the input voltage; and
$C_A$ is the input capacitance.
$C_B$ is the capacitance in the output position relative to the input plate.

The equivalent resistance R of the device is $$R=\frac{V_B}{I}=\frac{G}{faC_A}$$

$$G=\frac{C_A}{C_B}=\frac{V_B}{V_A}$$

where $V_B$ is the output voltage measured between plate 15 and ground.

The time constant T of the device (plus a capacity load) is equal to the number of seconds required to reach 63% of its final voltage value.

$$T=RCg=\frac{GCg}{faC_A}$$

$Cg$=capacitance of output electrode to ground.

It has been found that the time constants for single disk machines may be quite long, especially when connected to an electrostatic voltmeter having a capacitance which is high in comparison with the multiplier.

Figure 3:
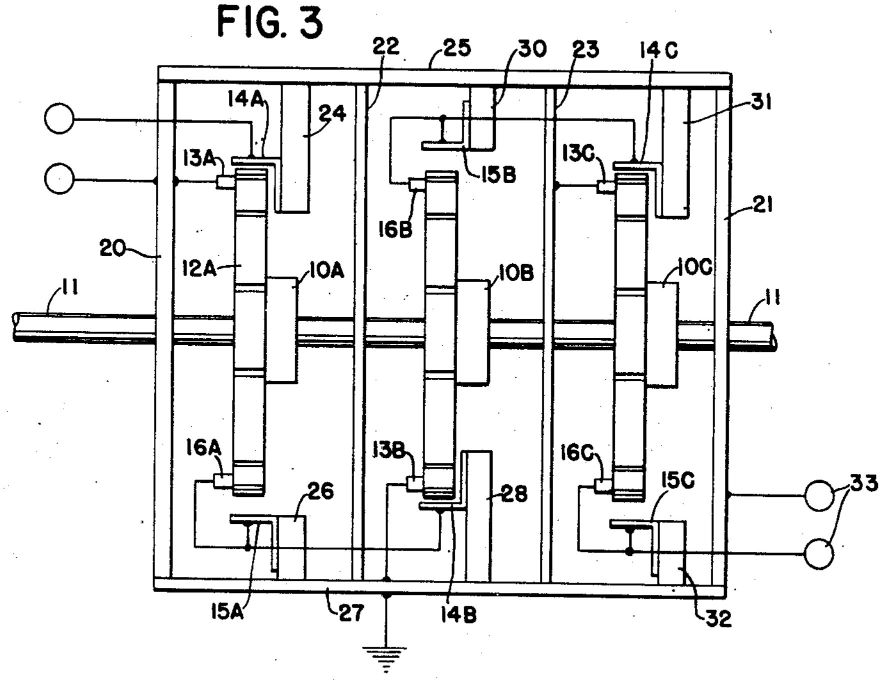
Fig. 3 is a side view of a three disk voltage multiplier, showing the input and output circuits, and the wiring of the interstage connections.

To shorten the time constant and still keep the required voltage multiplication, a three disk device was constructed as illustrated in Fig. 3. A central shaft 11 is rotatably mounted in side plates 20, 21, and carries three disks **10*a*, 10*b*, and 10*c*. Shield plates 22, 23 separate the three rotor disks in three compartments so that interstage coupling is reduced to a minimum. Each rotor carries a number of conducting sector plates 12*a*, 12*b*, and 12*c*** by which electrical charges are transferred from an input circuit to an output circuit.

An input plate **14*a* is supported by an insulator 24 which in turn is supported by a top conducting plate 25 which also acts as a shield plate. An input brush 13*a* is mounted so as to make contact with each sector as it passes into the field of the stator plate 14*a*. On the opposite side of the disk an output stator plate 15*a* is secured by an insulator 26 which in turn is mounted on a base plate 27. The output brush 16*a* is mounted in the same relative position with respect to the output plate as the brush 16** in Fig. 1.

The output conductor from the first stage is applied to the input stator plate **14*b* of the second stage and the input brush 13*b* is grounded. An insulator support 28 carries the input plate. The output section of this stage is similar to the output section of the first stage; the stator plate 15*b* being mounted on insulator 30 and connected to brush 16*b*. The output circuit of the second stage is directly connected to the input circuit of the last stage and the third output circuit is connected to two terminals 33** which serve to apply the amplified voltage to a load circuit.

In order to make the three stage voltage multiplier fast acting (have a short time constant) the design includes several features which cause a rapid voltage build-up. The gain per stage G is made low since the time constant varies directly as this quantity. Also, the output capacitance $Cg$ is made as low as possible, since this, too, lowers the time constant in direct ratio. The input capacitance could be increased to cause a further time constant reduction of the unit itself, but this would also increase the time constant of the input circuit. An optimum is attained if both time constants are equal.

The approximate relationship of the overall time constant $T_R$ to the time constants of the separate stages $T_1$, $T_2$, and $T_3$ are given by the formula, $$T_R=\sqrt{T_1^2+T_2^2+T_3^2 \cdots T_n^2}$$

If all the separate stages have the same time constant the equation reduces to $$T_R=\sqrt{n}\cdot T_1$$

A more detailed discussion of the above problem may be found in "Electronics Experimental Techniques" by Elmore and Sands, McGraw-Hill Book Co., New York, 1949, page 139.

If $G_1$ is the gain of a single stage and all the stages have an equal gain then the overall gain is $$G_R=G_1^n$$

To make the overall gain of a number of stages the same as that of a single stage $$G_S=\sqrt[n]{G_1}$$

Then the overall time constant $$T_R=\frac{\sqrt{n}}{\sqrt[n]{G^{n-1}}}\cdot T_1$$

Thus for all values of $$\frac{\sqrt{n}}{\sqrt[n]{G^{n-1}}}$$

which are less than 1 there is an improvement in the time constant. If there are three stages with an overall gain of 100 the time constant is one-twelfth of the time constant of a single stage having the same gain. Numerous experiments conducted with singe and triple stage multipliers have verified the above relationship.

It is possible to cause the last or output stage to provide current to an external load by applying a high input voltage to this stage so as to make the quantity of charge transported per revolution reasonably high. In this method of operation the current supplied depends upon the input voltage, the capacitance of the input plate, and the speed of the rotor. As such, the stage provides no voltage gain but serves only to transport charges from the last amplifier stage having a high impedance to the load having a relatively low impedance.

While the voltage multiplier described above is particularly adapted to be used with instruments for detecting and measuring penetrating radiation, it is obvious that it could be used in any application which calls for a direct current amplifier. As described, the multiplier gain is independent of the rotary speed of the disks within wide limits.

While the above description has been limited to a single and three stage multiplier, it will be obvious that any number of stages may be built without departing from the field of the invention which should be limited only by the scope of the appended claims.

We claim:

1. An electrostatic voltage multiplier for producing output potentials having a predetermined ratio to input potentials comprising, a rotatable insulator, a plurality of conducting sectors secured to said insulator, an input circuit including a stator conducting plate mounted adjacent to the conducting sectors and a contact brush which makes successive contact with the rotatable sectors, and an output circuit including a stator conducting plate mounted adjacent to the conducting sectors and connected to a contact brush which makes successive contact with the rotatable sectors as they move into the potential field of the output stator plate.

2. An electrostatic voltage multiplier for producing output potentials having a predetermined ratio to input potentials comprising, a frame for journalling a rotatable shaft, a disk shaped insulator secured to the shaft, a plurality of conducting sectors secured to said insulator, an input circuit including a stator conducting plate mounted on the frame adjacent to the conducting sectors and a contact brush which makes successive contact with the rotatable sectors, and an output circuit including a stator conducting plate mounted on the frame adjacent to the conducting sectors and connected to a contact brush which makes successive contact with the rotatable sectors as they move into the potential field of the output stator plate.

3. An electrostatic voltage multiplier for producing output potentials having a predetermined ratio to input potentials comprising, a frame for journalling a rotatable shaft, a disk shaped insulator secured to the shaft, and a plurality of conducting sectors secured to said insulator for carrying charges from an input circuit to an output circuit, said input circuit including a stator conducting plate mounted on the frame adjacent to the conducting sectors and a contact brush which makes successive contact with the rotatable sectors, said output circuit including a stator conducting plate mounted on the frame adjacent to the conducting sectors and connected to a contact brush which makes successive contact with the rotatable sectors as they move into the potential field of the output stator plate.

4. An electrostatic voltage multiplier for producing output potentials having a predetermined ratio to input potentials comprising, a frame for journalling a rotatable shaft, a disk shaped insulator secured to the shaft, and a plurality of conducting sectors secured to said insulator for carrying charges from an input circuit to an output circuit, said input circuit including input terminals for receiving potentials from an external source and a stator conducting plate mounted on the frame adjacent to the conducting sectors, a contact brush connected to the input circuit for making successive contact with each rotatable sector, said output circuit including a stator conducting plate mounted on the frame adjacent to the conducting sectors and connected to a contact brush which makes successive contact with each rotatable sector as it moves into the potential field of the output stator plate.

5. An electrostatic voltage multiplier for producing output potentials having a predetermined ratio to input potentials comprising, a frame for journalling a rotatable shaft, a disk shaped insulator secured to the shaft, and a plurality of conducting sectors secured to said insulator for carrying charges from an input circuit to an output circuit, said input circuit including input terminals for receiving potentials from an external source and a stator conducting plate mounted on the frame adjacent to the conducting sectors, a contact brush connected to the input circuit for making successive contact with each rotatable sector as it is moved into the potential field of the stator input plate, said output circuit including a stator conducting plate mounted on the frame adjacent to the conducting sectors and connected to a contact brush which makes successive contact with each rotatable sector as it moves into the potential field of the output stator plate.

6. An electrostatic voltage multiplier for producing output potentials having a predetermined ratio to input potentials comprising, a frame for journalling a rotatable shaft, a disk shaped insulator secured to the shaft, and a plurality of conducting sectors secured to said insulator for carrying charges from an input circuit to an output circuit, said input circuit including input terminals for receiving potentials from an external source and a stator conducting plate mounted on the frame adjacent to the conducting sectors, a contact brush connected to the input circuit for making successive contact with each rotatable sector as it is moved into the potential field of the stator input plate, said output circuit for delivering multiplied potentials to an external circuit, said output circuit including a stator conducting plate mounted on the frame adjacent to the conducting sectors and connected to a contact brush which makes successive contact with each rotatable sector as it is moved into the potential field of the output stator plate.

7. An electrostatic voltage multiplier for producing output potentials having a predetermined ratio to input potentials comprising, a plurality of rotatable insulator assemblies, a plurality of conducting sectors on each insulator, an input circuit for each rotatable insulator assembly including a stator conducting plate mounted adjacent to the conducting sectors and a contact brush which makes successive contact with the rotatable sectors, an output circuit for each rotatable insulator assembly including a stator conducting plate mounted adjacent to the conducting sectors and connected to a contact brush which makes successive contact with the rotatable sectors, and connecting means between each rotatable assembly for delivering the output of one assembly to the input circuit of another assembly.

8. An electrostatic voltage multiplier for producing output potentials having a predetermined ratio to input potentials comprising, a frame for journalling a rotatable shaft, a disk shaped insulator secured to the shaft, a plurality of conducting sectors secured to the periphery of the disk and insulated from each other, an input circuit for receiving voltage values from an external source, said input circuit comprising a stator conducting plate mounted on a frame adjacent to the conducting sectors, a contact brush connected to the input circuit for making successive contact with each sector, means for adjusting the input capacitance so as to control the voltage gain, an output circuit for delivering electrical power to a load circuit comprising a stator conducting plate mounted on the frame adjacent to the conducting sectors, and a contact brush for making successive contact with each sector as it moves into the potential field of the output stator plate.

9. An electrostatic voltage multiplier having a plurality of multiplier stages for producing output potentials having a predetermined ratio to input potentials comprising; a frame for journalling a rotatable shaft; a plurality of insulating disks, one for each stage, secured to the shaft; a plurality of conducting sectors secured to each disk and insulated from each other; an input circuit for each of said stages which includes a stator conducting plate mounted adjacent to the conducting sectors and an input contact brush which makes successive contact with the rotatable sectors; an output circuit for each of said stages which includes a stator conducting plate mounted adjacent to the conducting sectors and an output contact brush connected to the stator plate for making successive contact with the rotatable sectors; input terminals connected to the input circuit of one of the stages for receiving potentials from an external circuit; output terminals connected to the output circuit of one of the stages for applying a potential to an external load circuit; and intermediate coupling circuits for connecting the output circuit of one stage to the input circuit of another stage.

10. An electrostatic voltage multiplier having a plurality of multiplier stages for producing output potentials having a predetermined ratio to input potentials comprising; a frame for journalling a rotatable shaft; a plurality of insulating disks, one for each stage, secured to the shaft; a plurality of conducting sectors secured to each disk and insulated from each other; an input circuit for each of said stages which includes a stator conducting plate mounted adjacent to the conducting sectors and an input contact brush which makes successive contact with the rotatable sectors; an output circuit for each of said stages which includes a stator conducting plate mounted adjacent to the conducting sectors and an output contact brush connected to the stator plate for making successive contact with the rotatable sectors; input terminals connected to the input circuit of one of the stages for receiving potentials from an external circuit; output terminals connected to the output circuit of one of the stages for applying a potential to an external load circuit; and intermediate coupling circuits for connecting the output circuit of one stage to the input circuit of another stage; said output stage having a voltage multiplying factor of about unity as a result of providing output current for use in a current consuming load circuit.

CARL BOSCH.
MORRIS H. SHAMOS.

REFERENCES CITED

The following references are of record in the file of this patent:

UNITED STATES PATENTS

| Number | Name | Date |
|---|---|---|
| 479,941 | Henry | Aug. 2, 1892 |
| 2,523,689 | Felici | Sept. 26, 1950 |